W. FLETCHER.
TREE PROP.
APPLICATION FILED SEPT. 16, 1911.

1,051,208.

Patented Jan. 21, 1913.

Witnesses
B. Galt
Wm. Bagger

Inventor
Warren Fletcher.

By Victor J. Evans.
Attorney

UNITED STATES PATENT OFFICE.

WARREN FLETCHER, OF HEMET, CALIFORNIA.

TREE-PROP.

1,051,208.　　　　　Specification of Letters Patent.　　Patented Jan. 21, 1913.

Continuation of application Serial No. 542,497, filed February 17, 1910. This application filed September 16, 1911. Serial No. 649,695.

*To all whom it may concern:*

Be it known that I, WARREN FLETCHER, a citizen of the United States of America, residing at Hemet, in the county of Riverside and State of California, have invented new and useful Improvements in Tree-Props, of which the following is a specification.

This invention relates to tree props, and the present application is a continuation of application, Serial Number 542,497, filed by me on February 17, 1910.

The invention has for its object to provide a simple, inexpensive and efficient device which may be readily applied to the limbs or branches of fruit or other trees to prevent them from becoming broken.

The device is particularly intended to be used in connection with fruit trees when the latter are overloaded with fruit or under similar circumstances when the limbs of the tree are unable to support the weight which they bear.

A further object of the invention is to produce a simple and efficient device which may be readily applied to the limbs or branches of fruit or other trees to enable such limbs or branches to mutually sustain each other and to prevent splitting at the forks.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

Figure 1:
Figure 2:
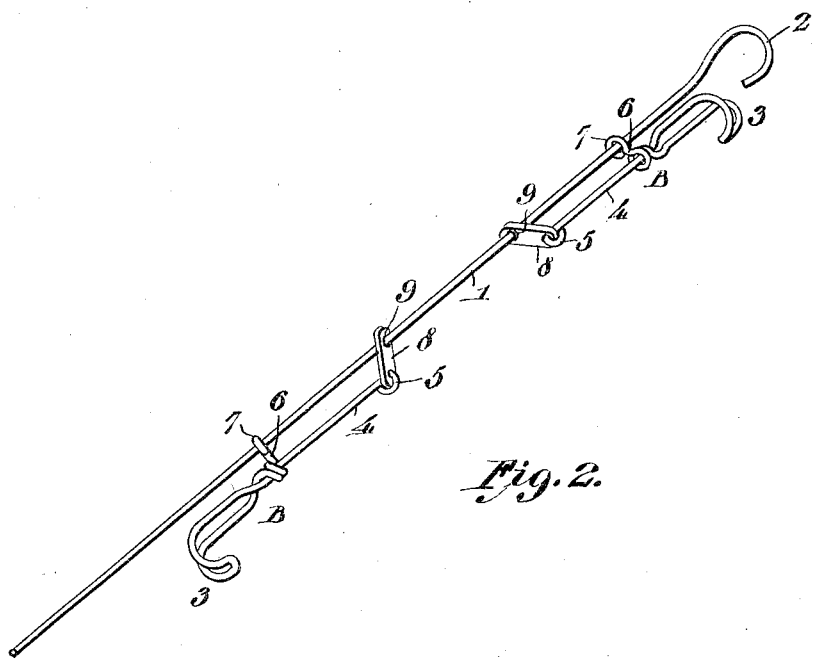

In the drawing,—Figure 1 is a perspective view illustrating various ways of applying the invention operatively in connection with a tree. Fig. 2 is a perspective view on an enlarged scale, showing the construction of the device.

Corresponding parts in both figures are denoted by like characters of reference.

The improved device comprises a rod 1 which may consist of a rod or a piece of wire of suitable dimensions, and which may be bent to form a hook 2 at one end thereof, said rod or wire being sufficiently stiff and rigid to enable the hook to sustain such weight as may be imposed thereon without yielding or straightening out, and said rod being, except the hooked portion, perfectly straight.

B designates a brace member including a hook 3 formed at one end of a shank 4 having at its opposite end a terminal eye 5. Extending laterally from the brace member B at the base of the hook, that is to say, at the juncture of the hook 3 and the shank 4 is an arm 6 having a terminal eye 7 which slidably engages the rod 1. Flexibly connected with the terminal eye 5 of the shank 4 is a locking plate 8 having an aperture 9 slidably engaging the rod 1. It will be seen that by this construction the brace member B is slidably connected with the rod 1 by the arm 6 having the eye 7 and by the locking plate 8 having the eye 9, said arm and locking plate serving to maintain the brace member in spaced relation to the rod 1 which latter being straight, will admit of the brace member sliding freely the entire length thereof.

In practice, a plurality of brace members B may be mounted upon a single supporting rod 1, it being understood that when only a single brace member is used, the hook 3 of such brace member will be reversely disposed with relation to the hook 2 upon said rod 1. When a plurality of brace members are used the hooks pertaining to such brace members may be reversely disposed with reference to each other, as indicated in Fig. 2 of the drawing, where two brace members have been shown. In such case the terminal hook 2 upon the supporting rod 1 may be dispensed with.

It will be understood that the brace member or members B may be readily slid or moved to any desired position upon the supporting rod, which latter may be of any desired length. When strain is exerted upon the hook 3 of any brace member while the supporting rod or element is maintained in a relatively stationary position, the locking plate will become tilted upon the supporting element, and opposite edges of the aperture 9 will bite upon said supporting element, thereby locking the plate 8 in position and maintaining the brace member in adjusted position without bending or distorting the supporting rod or member.

In the practical use of this device, which has been illustrated in Fig. 1 of the drawing, a supporting element 1 may be connected by means of its terminal hook 2 with a rigid pole A which has been planted adjacent to the tree against which the said pole may lean, if desired. Such supporting rod or element, which in Fig. 1 of the drawings has been specially designated 1$^a$, may be equipped with one or more brace members B, the hooks 3 of which are reversely disposed with reference to the supporting hook 2 of the supporting element 1$^a$, and such brace member or members may be conveniently arranged to support one or more limbs of the tree, as indicated.

A slightly different arrangement is indicated at 1$^b$ where the terminal hook of the supporting element thus designated is engaged with a limb of the tree, while the brace members B, B are used to support other limbs.

The supporting element designated by 1$^c$ consists of a straight rod without an integral terminal hook, said supporting element being equipped with brace members, the hooks 3 of which are reversely disposed with reference to each other, said brace members being used to afford mutual support to the limbs of the tree.

It is obvious that within the scope of the invention the number of brace members used in connection with a single supporting element may be varied and that said brace members may be adjusted and utilized in any manner that will afford the best support to the limbs and branches of the tree.

As will be seen from the foregoing description, taken in connection with the drawing hereto annexed, the improved tree prop or bracing device is extremely simple in construction and capable of being manufactured at a very moderate expense. It may be easily and quickly applied or detached, and its manner of application enables the limbs and branches of a tree to be supported in the most simple and advantageous manner to prevent injury to the tree resultant upon sagging of the branches when overloaded.

It will be particularly noted that the brace members B are not only longitudinally slidable upon the supporting member 1 but are capable of being rotated about the axis of the latter, thus enabling the hooks of said brace members to be readily applied to limbs or branches that extend from the tree at various angles and in various planes.

Having thus described the invention, what is claimed as new, is:—

In a tree brace and supporting device, a supporting element consisting of a straight rigid rod having a hook at one end, a brace member including a hook, a shank extending longitudinally from the hook and having a terminal eye, and an arm extending laterally from the hook and having a terminal eye slidably engaging the supporting rod, and a locking plate flexibly associated with the terminal eye of the shank of the brace member and having an aperture slidably engaging the supporting rod and adapted to bite upon the latter when the locking plate is tilted by stress exerted on the hook of the brace member.

In testimony whereof I affix my signature in presence of two witnesses.

WARREN FLETCHER.

Witnesses:
 CHAS. ODELL,
 LEIGH SMITH.

---

Copies of this patent may be obtained for five cents each, by addressing the "Commissioner of Patents, Washington, D. C."